United States Patent
Kao

(10) Patent No.: US 10,135,485 B2
(45) Date of Patent: Nov. 20, 2018

(54) SIGNAL TRANSCEIVING CIRCUIT AND RECEIVING CIRCUIT CONTROL METHOD

(71) Applicant: Realtek Semiconductor Corp., HsinChu (TW)

(72) Inventor: Tzu-Ming Kao, Hualien County (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 15/680,228

(22) Filed: Aug. 18, 2017

(65) Prior Publication Data
US 2018/0054230 A1 Feb. 22, 2018

(30) Foreign Application Priority Data
Aug. 19, 2016 (TW) .............................. 105126524 A

(51) Int. Cl.
| | | |
|---|---|---|
| H04B 1/48 | (2006.01) | |
| H04B 3/20 | (2006.01) | |
| H04B 10/50 | (2013.01) | |
| H04B 15/00 | (2006.01) | |

(52) U.S. Cl.
CPC ............... *H04B 1/48* (2013.01); *H04B 3/20* (2013.01); *H04B 10/50595* (2013.01); *H04B 15/005* (2013.01)

(58) Field of Classification Search
CPC ................. H04B 10/50595; H04B 10/50575
USPC ............ 455/115.1, 115.2, 127.1, 126, 73, 85
See application file for complete search history.

(56) References Cited

U.S. PATENT DOCUMENTS

| | | | | |
|---|---|---|---|---|
| 2005/0258989 A1* | 11/2005 | Li | ...................... | H03M 1/1019 341/120 |
| 2006/0263092 A1* | 11/2006 | Hosking | ............ | H04B 10/0799 398/135 |
| 2009/0289724 A1* | 11/2009 | Hu | .......................... | H03L 7/095 331/16 |
| 2012/0313709 A1* | 12/2012 | Lautzenhiser | .......... | H03F 1/301 330/285 |

FOREIGN PATENT DOCUMENTS

TW 201448490 A 12/2014

* cited by examiner

*Primary Examiner* — John J Lee
(74) *Attorney, Agent, or Firm* — Winston Hsu

(57) ABSTRACT

A transceiving circuit, which comprises: a transmitting circuit, configured to transmit a test signal; a receiving circuit, comprising a mixer configured to receive a plurality of predetermined DC bias voltage groups, wherein the receiving circuit generates a plurality of output signals according to the test signal while the mixer operates at the predetermined DC bias voltage groups; a frequency domain analyzing circuit, configured to transform the output signals to a plurality of frequency domain signals; and a DC bias voltage generating circuit, configured to generate a function according to the frequency domain signals and the predetermined bias voltage groups, and configured to generate a first DC bias voltage group to the mixer according to the function.

17 Claims, 5 Drawing Sheets

SIGNAL TRANSCEIVING CIRCUIT AND RECEIVING CIRCUIT CONTROL METHOD

BACKGROUND OF THE INVENTION

1. Field of the Invention

The present disclosure relates to a transceiving circuit and a receiving circuit control method, and particularly to a transceiving circuit and a receiving circuit control method which reduces noise.

2. Description of the Prior Art

In a conventional transceiving circuit, the signal transmitted by the transmitting circuit may cause noise to the receiving circuit. Some noise is initially out-band, but may be coupled to become in-band due to the second order nonlinear effect of the receiving circuit.

Therefore, some methods are provided to solve such issue. For example, such issue can be addressed by adjusting a DC bias voltage for a mixer in the transceiving circuit. However, the conventional method usually applies a binary search method to compute a suitable DC bias voltage. Therefore, such conventional method cannot calculate the DC bias voltage efficiently, and requires a long computing time and a high cost to acquire a suitable DC bias voltage.

SUMMARY OF THE INVENTION

The present disclosure provides a transceiving circuit. The transceiving circuit includes a transmitting circuit, a receiving circuit, a frequency domain analyzing circuit, and a DC bias voltage generating circuit. The transmitting circuit transmits a test signal. The receiving circuit includes a mixer which receives multiple predetermined DC bias voltage groups, in which the receiving circuit generates multiple output signals according to the test signal while the mixer operates at the predetermined DC bias voltage groups. The frequency domain analyzing circuit transforms the output signals to multiple frequency domain signals. The DC bias voltage generating circuit generates a function according to the frequency domain signals and the predetermined bias voltage groups, and generates a first DC bias voltage group to the mixer according to the function.

Control method and voltage generating circuit corresponding to above embodiment are provided in other embodiments.

Based on the embodiments above, the issue existing in the prior art (e.g., a large amount of computation for computing an ideal mixer DC bias voltage) can be solved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
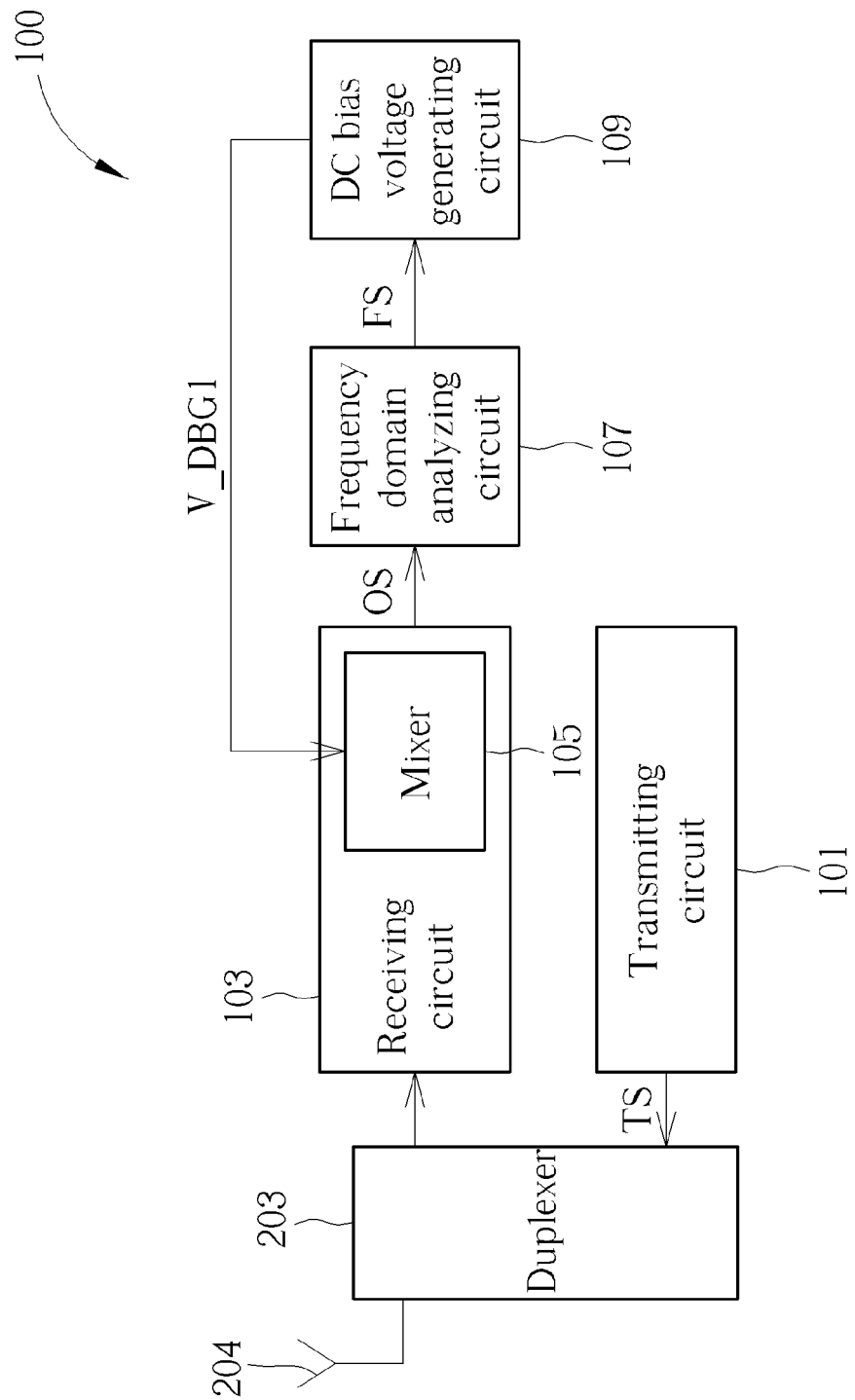
FIG. 1 is a block diagram illustrating a transceiving circuit according to one embodiment of the present disclosure.

FIG. 1 is a block diagram illustrating a transceiving circuit 100 according to one embodiment of the present disclosure. The transceiving circuit 100 comprises a transmitting circuit 101, a receiving circuit 103, a frequency domain analyzing circuit 107, a DC bias voltage generating circuit 109, a duplexer 203, and an antenna 204. The receiving circuit 103 comprises a mixer 105. The transmitting circuit 101 is coupled to the duplexer 203. The receiving circuit 103 is coupled to the duplexer 203, the frequency domain analyzing circuit 107 and the DC bias voltage generating circuit 109. The frequency domain analyzing circuit 107 is coupled to the DC bias voltage generating circuit 109, and the duplexer 203 is coupled to the antenna 204. The transmitting circuit 101 transmits a test signal TS to the duplexer 203.

The receiving circuit 103 receives a transferred signal output from the duplexer 203. In this embodiment, the transferred signal is a TX leakage signal caused by the transmission of the test signal TS from the transmitting circuit 101. Even if the TX leakage signal is an out-band signal, the receiving circuit 103 still generates the output signal according to the TX leakage signal since the receiving circuit 103 has a second order nonlinear effect.

The mixer 105 downconverts the transferred signal or an amplified transferred signal based on the DC bias voltage group V_DBG1. For example, the receiving circuit 103 further comprises an amplifier (not illustrated) for amplifying the transferring signal. The mixer 105 downconverts the output of the amplifier based on the DC bias voltage group V_DBG1. Next, the receiving circuit 103 generates the output signal OS according to the output of the mixer 105. In some embodiments, the DC bias voltage group V_DBG1 may comprise at least one DC bias voltage.

The frequency domain analyzing circuit 107 transforms the output signal OS to a frequency domain signal FS. The frequency domain analyzing circuit 107 can be implemented by any circuit which can transform a time domain signal to a frequency domain signal. For example, the frequency domain analyzing circuit 107 can be a Fast Fourier Transform circuit. It should be noted that a relation between energy of the frequency domain signal FS output from the frequency domain analyzing circuit 107 and the DC bias voltage group V_DBG1 received by the mixer can be modeled as a quadratic function. Therefore, the frequency domain analyzing circuit 107 correspondingly generates a plurality of frequency domain signals FS according to the test signal TS while the mixer 105 operates at a plurality of DC bias voltage groups.

The DC bias voltage generating circuit 109 generates an ideal DC bias voltage group according to the frequency domain signal FS. The mixer 105 may downconvert the transferring signal or the amplified transmitting signal based on the ideal DC bias voltage group. The duplexer 203 is configured to switch between a path from the antenna 204 to the transmitting circuit 101 and a path from the antenna 204 to the receiving circuit 103.

Figure 2:
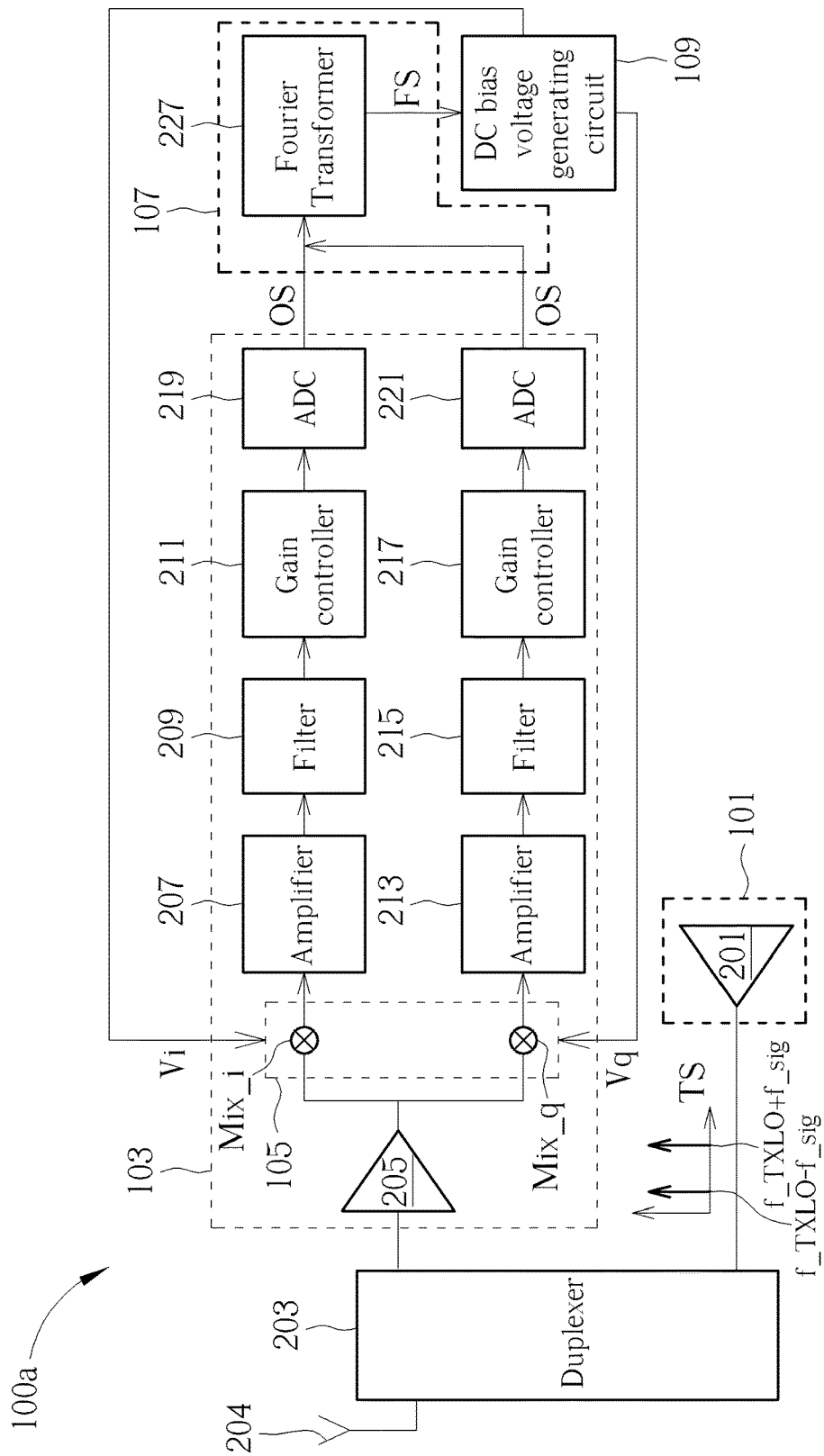
FIG. 2 is a schematic diagram illustrating one implementation of the transceiving circuit in FIG. 1.

Reference is made to FIG. 2, one implementation of the transceiving circuit 100, i.e., the transceiving circuit 100a, is illustrated. The transmitting circuit 101 comprises an amplifier 201, and the other elements of the transmitting circuit 101 are not illustrated here for brevity. The receiving circuit 103 comprises an amplifier 205, a mixer 105, amplifiers 207, 213, filters 209, 215, gain controllers 211, 217 and analog to digital converters 219, 211. The mixer 105 comprises mixers Mix_i and Mix_q. In some embodiments, the amplifier 205 is a low noise amplifier.

The mixer Mix_i, the amplifier 207, the filter 209, the gain controller 211 and the analog to digital converter 219 form an I path. On the other hand, the mixer Mix_q, the amplifier 213, the filter 215, the gain controller 217 and the analog to digital converter 221 form a Q path. The frequency domain analyzing circuit 107 comprises a Fourier transformer 227. The output signals OS from the I path and the Q path are transformed by the Fourier transformer 227. It should be noted that the circuit illustrated in FIG. 2 is only for example and does not mean to limit the scope of the present invention. In some embodiments, the transceiving circuit 100a may not comprise the amplifiers 205, 207, 213, filters 209, 215 and/or the gain controllers 211, 217.

In one embodiment, the test signal TS is a two-tone signal with frequencies f_TXLO−f_sig and f_TXLO+f_sig. The frequency f_TXLO is a carrier frequency of the transmitting circuit 201, and the frequency f_sig is a predetermined frequency. As mentioned above, since the receiving circuit 103 has a second order nonlinear effect, the frequency 2×f_sig of the frequency signal FS caused by the test signal TS becomes an in-band signal. In some embodiments, the frequency domain analyzing circuit 107 can be a single frequency Fourier Transform circuit. That is, the frequency domain analyzing circuit 107 computes the signal strength of the output signal OS only at the frequency 2×f_sig, in which the frequency 2×f_sig is also called the test frequency 2×f_sig. In some embodiments, the predetermined frequency f_sig can be determined according to the bandwidth which the receiving circuit 103 uses.

In the embodiment of FIG. 2, the DC bias voltage group V_DBG1 comprises an I path DC bias Vi and a Q path DC bias Vq. Since the relation between energy of the frequency domain signal FS output by the Fourier transformer 227 and the DC bias voltage group received by the mixer 105 can be modeled as a quadratic function, the signal strength P of the frequency domain signal FS at the test frequency 2×f_sig can be shown as a function $P(Vi, Vq)=miVi+mqVq+P(Vi=0, Vq=0)$, in which the energy of the frequency signal FS is $|P|^2$. $P(Vi=0, Vq=0)$ is a signal strength of the frequency domain signal FS when the transmitting circuit 101 transmits the test signal TS, and when Vi, Vq are zero. mi, mq are coefficients. Therefore, if the coefficients mi and mq can be acquired, the function $P(Vi, Vq)$ can be acquired. In the present embodiment, the DC bias voltage generating circuit 109 sets at least one predetermined DC bias voltage group, such that the DC bias voltage generating circuit 109 can acquire the coefficients mi and mq according to the frequency domain signal FS, to generate an ideal I path DC bias voltage and an ideal Q path DC bias voltage (i.e., an ideal DC bias voltage group).

In one embodiment, the DC bias voltage generating circuit 109 sets five predetermined DC bias voltage groups such that the DC bias voltage generating circuit 109 can compute the coefficients mi and mq according to the corresponding frequency domain signals FS. It should be noted that the quadratic function mentioned above may change corresponding to the structure of the mixer 105. Therefore, the computation of the relation between the DC bias voltage groups and the frequency signals FS output by the frequency domain analyzing circuit 107 may need different numbers of DC bias voltage groups. In this embodiment, five predetermined DC bias voltage groups are as follows:

first DC bias voltage group $(Vi\_0, Vq\_0)=(-Vo, 0)$
second DC bias voltage group $(Vi\_1, Vq\_1)=(Vo, 0)$
third DC bias voltage group $(Vi\_2, Vq\_2)=(0, -Vo)$
fourth DC bias voltage group $(Vi\_3, Vq\_3)=(0, Vo)$
fifth DC bias voltage group $(Vi\_4, Vq\_4)=(0, 0)$ Vo is a predetermined voltage, which can be selected corresponding to the structure of the transceiving circuit 100/100a.

The following explains the steps for computing the coefficients mi, mq and $P(Vi=0, Vq=0)$ of the function $P(Vi, Vq)=miVi+mqVq+P(Vi=0, Vq=0)$ according to the five predetermined DC bias voltage groups and the corresponding frequency domain signals FS.

The coefficient mi can be estimated based on the first DC bias voltage group and the second DC bias voltage group:

$$\frac{\partial P(Vi, Vq)}{\partial Vi} = \qquad \text{Equation (1)}$$

$$mi = \frac{P\_1 - P\_0}{Vi\_1 - Vi\_0} = \frac{P\_1 - P\_0}{(Vo - (-Vo))} \Rightarrow mi = \frac{P\_1 - P\_0}{2Vo}$$

P_0 and P_1 are the signal strengths of the frequency domain signals FS corresponding to the first and the second DC bias voltage group respectively at the test frequency 2×f_sig.

The coefficient mq can be estimated based on the third and the fourth DC bias voltage group:

$$\frac{\partial P(Vi, Vq)}{\partial Vq} = \qquad \text{Equation (2)}$$

$$mq = \frac{P\_3 - P\_2}{Vq\_3 - Vq\_2} = \frac{P\_3 - P\_2}{(Vo - (-Vo))} \Rightarrow mq = \frac{P\_3 - P\_2}{2Vo}$$

P_2 and P_3 are the signal strengths of the frequency domain signals FS corresponding to the third and the fourth DC bias voltage group respectively at the test frequency 2×f_sig.

The $P(Vi=0, Vq=0)$ can be estimated based on the fifth DC bias voltage group.

$$P(Vi=0, Vq=0)=P\_4 \qquad \text{Equation (3)}$$

P_4 is the signal strength of the frequency domain signal FS corresponding to the fifth DC bias voltage group at the test frequency 2×f_sig.

After that, since estimation of the coefficients mi, mq and $P(Vi=0, Vq=0)$ are acquired, the ideal DC bias voltage group is assumed to be a first ideal DC bias voltage group (Vi_opt1, Vq_opt1) which let $P(Vi\_opt1, Vq\_opt1)$ equals to 0+0j. In other words, the frequency signal FS caused by the test signal TS becomes 0, and the following Equation (4) is acquired.

$$P(Vi\_opt, Vq\_opt) = 0 + 0j = \qquad \text{Equation (4)}$$

$$\frac{P\_1 - P\_0}{2Vo} \times Vi\_opt1 + \frac{P\_3 - P\_2}{2Vo} \times Vq\_opt1 + P\_4$$

If the real part and the imaginary part of the Equation (4) are processed by simultaneous equations, the first ideal DC bias voltage group (Vi_opt1, Vq_opt1) can be acquired.

In addition, the first ideal DC bias voltage group (Vi_opt1, Vq_opt1) can replace the fifth DC bias voltage group as another predetermined DC bias voltage group, and P(Vi, Vq)=miVi+mqVq+P(Vi=0, Vq=0) becomes P(Vi, Vq)=miVi+mqVq+P(Vi=Vi_opt1, Vq=Vq_opt1). In this way, a second ideal DC bias voltage group can be acquired. In detail, the Fourier transformer 227 can generate a corresponding frequency domain signal FS according to the another predetermined DC bias voltage group. The DC bias voltage generating circuit 109 can acquire the second ideal DC bias voltage group according to signal strengths P_0, P_1, P_2, P_3, P(Vi=Vi_opt1, Vq=Vq_opt1) and Equation (4). Another setting of the predetermined DC bias voltage groups is as follows:

first DC bias voltage group (Vi_0, Vq_0)=(−Vo, 0)
second DC bias voltage group (Vi_1, Vq_1)=(Vo, 0)
third DC bias voltage group (Vi_2, Vq_2)=(0, −Vo)
fourth DC bias voltage group (Vi_3, Vq_3)=(0, Vo)
fifth DC bias voltage group (Vi_4, Vq_4)=(Vi_opt1, Vq_opt1)

It should be noted that the above iteration processes can be repeated. In this way, the DC bias voltage generating circuit 109 can generate an updated ideal DC bias voltage group.

Figure 3:
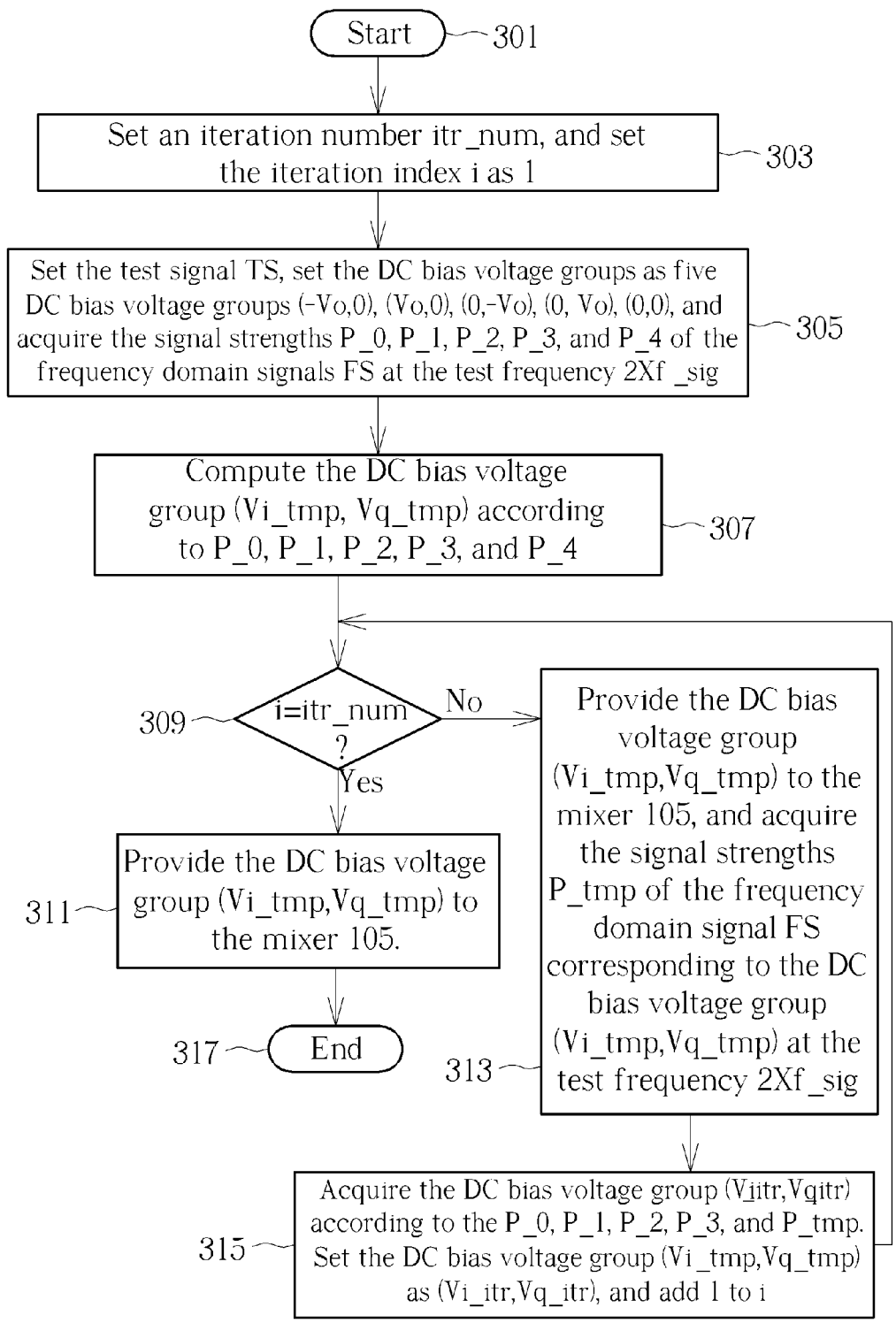
FIG. 3 is a flow chart illustrating a method of computing a DC bias group according to one embodiment of the present disclosure.

FIG. 3 is a flow chart illustrating a method of computing a DC bias group according to one embodiment of the present disclosure. The method in FIG. 3 can be applied to the transceiving circuits in FIG. 1 and FIG. 2 respectively. The method in FIG. 3 comprises following steps:

Step 301
Start.
Step 303:
Set an iteration number itr_num, and set the iteration index i as 1.
Step 305:
Set the test signal TS, set the DC bias voltage groups as five DC bias voltage groups (−Vo, 0), (Vo, 0), (0, −Vo), (0, Vo), (0, 0), and acquire the signal strengths P_0, P_1, P_2, P_3, and P_4 of the frequency domain signals FS at the test frequency 2×f_sig.
Step 307
Compute the DC bias voltage group (Vi_tmp, Vq_tmp) according to P_0, P_1, P_2, P_3, and P_4. Please note that the DC bias voltage group (Vi_tmp, Vq_tmp) here can be the first ideal DC bias voltage group (Vi_opt1, Vq_opt1) mentioned above.
Step 309
Determine if the iteration index i equals the iteration number itr_num. If yes, go to step 311. If not, go to step 313.
Step 311
Provide the DC bias voltage group (Vi_tmp, Vq_tmp) to the mixer 105.
Step 313
Provide the DC bias voltage group (Vi_tmp, Vq_tmp) to the mixer 105, and acquire the signal strengths P_tmp of the frequency domain signal FS corresponding to the DC bias voltage group (Vi_tmp, Vq_tmp) at the test frequency 2×f_sig.
Step 315
Acquire the DC bias voltage group (Vi_itr, Vq_itr) according to the P_0, P_1, P_2, P_3, and P_tmp. Set the DC bias voltage group (Vi_tmp, Vq_tmp) as (Vi_itr, Vq_itr), and add 1 to i. In other embodiments, the DC bias voltage group (Vi_tmp, Vq_tmp) is set as (Vi_itr+Vi_tmp, Vq_itr+Vq_tmp).
Step 317
End.

Figure 4:
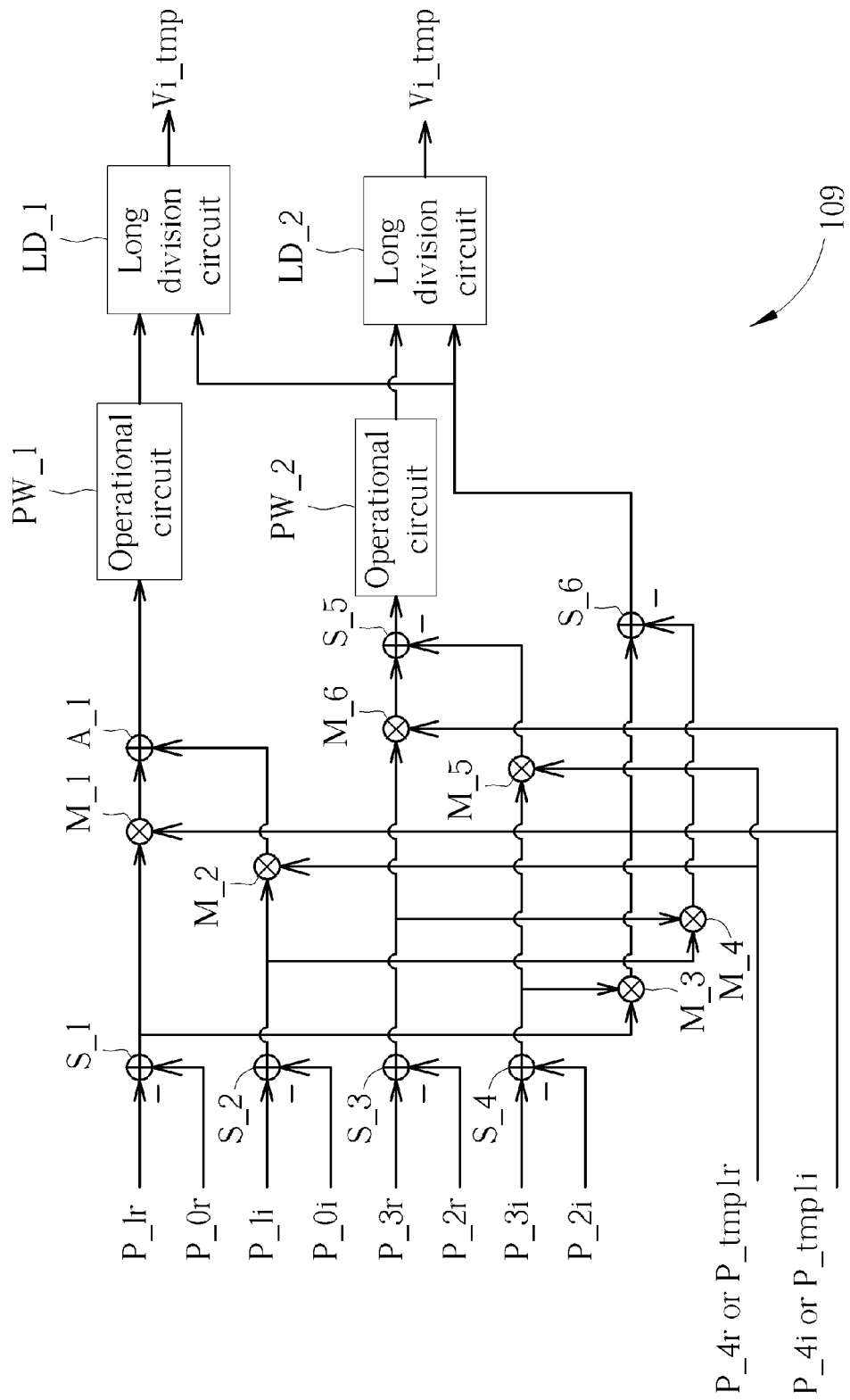
FIG. 4 is a schematic diagram illustrating one implementation of the DC bias voltage generating circuit in FIG. 1.

FIG. 4 is a schematic diagram illustrating one implementation of the DC bias voltage generating circuit 109 in FIG. 1. The DC bias voltage generating circuit 109 comprises subtractors S_1-S_6, an adder A_1, multipliers M_1-M_6, operational circuits PW_1-PW_2, and long division circuits LD_1, LD_2. The operational circuits PW_1 and PW_2 multiply $2^{(\overline{V_o}+1)}$ to the input signal. The Vo here is the Vo mentioned above. The long division circuits LD_1, LD_2 perform long division to the signals input to the long division circuits LD_1, LD_2.

The subtractor S_1 comprises an input terminal receiving the real part signal P_1r of the frequency domain signal P_1 corresponding to the second DC bias voltage group, and a subtracting terminal receiving the real part signal P_0r of the frequency domain signal P_0 corresponding to the first DC bias voltage group. The subtractor S_2 comprises an input terminal receiving the imaginary part signal P_1i of the frequency domain signal P_1, and a subtracting terminal receiving the imaginary part signal P_0i of the frequency domain signal P_0. The subtractor S_3 comprises an input terminal receiving the real part signal P_3r of the frequency domain signal P_3 corresponding to the fourth DC bias voltage group, and a subtracting terminal receiving the real part signal P_2r of the frequency domain signal P_2 corresponding to the third DC bias voltage group. The subtractor S_4 comprises an input terminal receiving the imaginary part signal P_3i of the frequency domain signal P_3, and comprises a subtracting terminal receiving the imaginary part signal P_2i of the frequency domain signal P_2.

The first input terminal of the multiplier M_1 is coupled to an output terminal of the subtractor S_1. The second input terminal of the multiplier M_1 receives the imaginary part signal P_4i of the frequency domain signal P_4 corresponding to the fifth predetermined DC bias voltage group, or receives the imaginary part signal P_tmp1i of the ideal frequency domain signal P_tmp1 corresponding to the first ideal DC bias voltage group. The first input terminal of the multiplier M_2 is coupled to an output terminal of the second subtractor S_2. The second input terminal of the multiplier M_2 receives the real part signal P_4r of the frequency domain signal P_4, or receives the real part signal P_tmp1r of the ideal frequency domain signal P_tmp1. The multiplier M_3 comprises a first input terminal coupled to an output terminal of the subtractor S_1, and comprises a second input terminal coupled to an output terminal of the subtractor S_4. The multiplier M_4 comprises a first input terminal coupled to an output terminal of the subtractor S_2, and comprises a second input terminal coupled to an output terminal of the subtractor S_3. The first input terminal of the multiplier M_5 is coupled to an output terminal of the subtractor S_4. The second input terminal of the multiplier M_5 receives the real part signal P_4r of the frequency domain signal P_4, or receives the real part signal P_tmp1r of the ideal frequency domain signal P_tmp1. The first input terminal of the multiplier M_6 is coupled to an output terminal of the subtractor S_3. The second input terminal of the multiplier M_6 receives the imaginary part signal P_4i of the frequency domain signal P_4, or receives the imaginary part signal P_tmp1i of the ideal frequency domain signal P_tmp1.

The adder A_1 comprises a first input terminal coupled to an output terminal of the multiplier M_1, a second input terminal coupled to an output terminal of the multiplier M_2, and an output terminal coupled to the operational circuit PW_1. The subtractor S_5 comprises an input terminal coupled to an output terminal of the multiplier M_6, a subtracting terminal coupled to an output terminal of the multiplier M_5, and an output terminal coupled to the operational circuit PW_2. The subtractor S_6 comprises an input terminal coupled to an output terminal of the multiplier M_3, a subtracting terminal coupled to an output terminal of the multiplier M_4, and an output terminal coupled to the long division circuit LD_2.

Equation (4) can be performed by the circuit illustrated in FIG. 4. However, the circuit in FIG. 4 is only for example and does not mean to limit the scope of the present invention. In some embodiments, The circuit in FIG. 4 can be regarded as voltage generating circuit.

Figure 5:
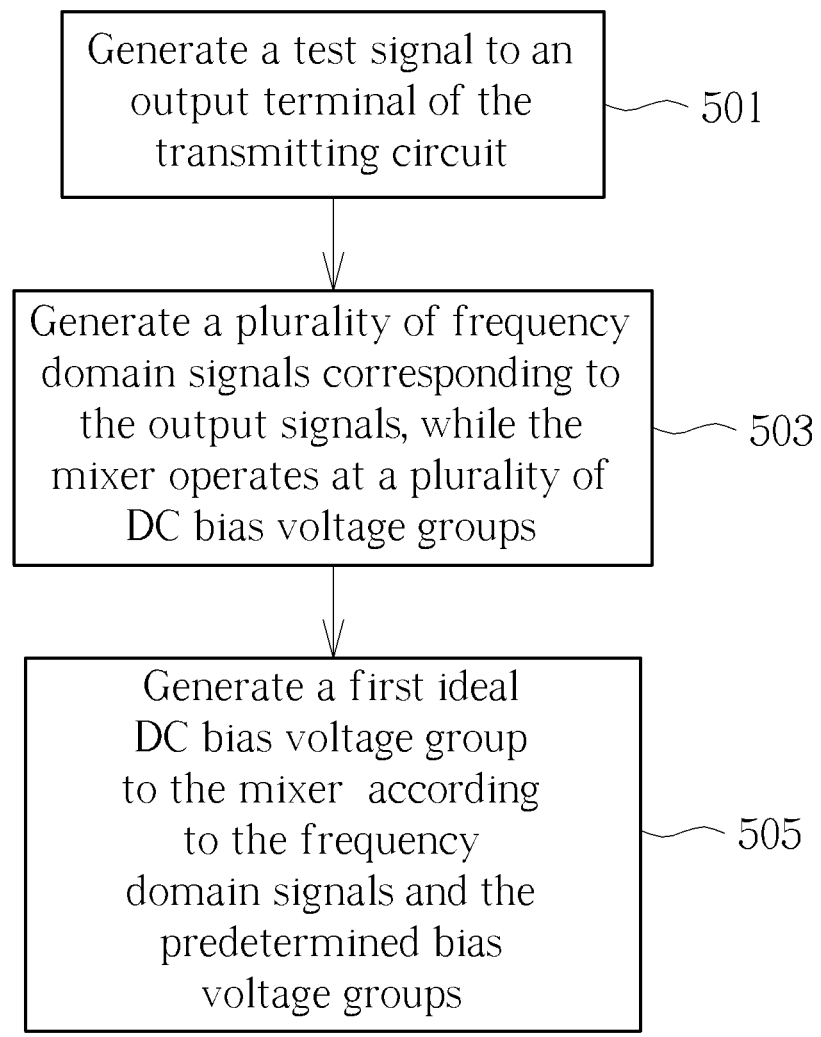
FIG. 5 is a flow chart illustrating a receiving circuit control method according to one embodiment of the present disclosure.

In view of the embodiments above, a receiving circuit control method illustrated in FIG. 5 can be acquired, which is applied to a transceiving circuit comprising a transmitting circuit and a receiving circuit, in which the receiving circuit comprises a mixer. The relation between energy of the frequency domain signal output by the receiving circuit at the test frequency and the DC bias voltage group received by the mixer can be modeled as a quadratic function. The receiving circuit control method comprises the following steps:

Step 501

Generate a test signal to an output terminal of the transmitting circuit.

Step 503

Generate a plurality of frequency domain signals corresponding to the output signals, while the mixer operates at a plurality of DC bias voltage groups.

Step 505

Generate a first ideal DC bias voltage group to the mixer according to the frequency domain signals and the predetermined bias voltage groups.

In view of embodiments mentioned above, an ideal mixer DC bias voltage can be acquired via simple steps. In this way, the problem in the prior art that a large amount of computing is needed for computing an ideal mixer DC bias voltage can be fixed.

What is claimed is:

1. A transceiving circuit, comprising:
a transmitting circuit, configured to transmit a test signal;
a receiving circuit, comprising a mixer configured to receive a plurality of predetermined DC bias voltage groups, wherein the receiving circuit generates a plurality of output signals according to the test signal while the mixer operates at the predetermined DC bias voltage groups;
a frequency domain analyzing circuit, configured to transform the plurality of output signals to a plurality of frequency domain signals; and
a DC bias voltage generating circuit, configured to determine parameters of an equation according to the frequency domain signals and the predetermined bias voltage groups, and configured to generate a first DC bias voltage group to the mixer according to the equation.

2. The transceiving circuit of claim 1,
wherein the mixer comprises a first mixer corresponding to an I path and a second mixer corresponding to a Q path, and each one of the predetermined DC bias voltage groups comprises a predetermined I path DC bias voltage and a predetermined Q path DC bias voltage; and
wherein the equation is $P(V_i, V_q) = m_i V_i + m_q V_q + P(V_i=0, V_q=0)$, $V_i$ indicates a DC bias voltage received by the first mixer, $V_q$ indicates a DC bias voltage received by the second mixer, $P(V_i, V_q)$ is a signal strength of the frequency domain signal output by the frequency domain analyzing circuit at a test frequency, $m_i$ and $m_q$ are coefficients;
wherein $P(V_i=0, V_q=0)$ is a signal strength of the frequency domain signal output by the frequency domain analyzing circuit at the test frequency while $V_i$ and $V_q$ are zero;
wherein the DC bias voltage generating circuit computes the $m_i$ and $m_q$ according to the frequency domain signals and the predetermined DC bias voltage groups, and then computes a first I path DC bias voltage and a first Q path DC bias voltage as the first DC bias voltage group according to the equation, wherein the test signal determines the test frequency.

3. The transceiving circuit of claim 2, wherein the predetermined DC bias voltage groups comprise a first and a second predetermined DC bias voltage groups, wherein the predetermined I path DC bias voltage and the predetermined Q path DC bias voltage of the first DC bias voltage group are $(-V_o, 0)$, and the predetermined I path DC bias voltage and the predetermined Q path DC bias voltage of the second DC bias voltage group are respectively $(V_o, 0)$, in which $V_o$ is a predetermined voltage.

4. The transceiving circuit of claim 2, wherein the predetermined DC bias voltage groups comprise a third and a fourth predetermined DC bias voltage groups, wherein the predetermined I path DC bias voltage and the predetermined Q path DC bias voltage of the third DC bias voltage group are $(0, -V_o)$, and the predetermined I path DC bias voltage and the predetermined Q path DC bias voltage of the fourth DC bias voltage group are $(0, V_o)$, wherein $V_o$ is a predetermined voltage.

5. The transceiving circuit of claim 2, wherein the predetermined DC bias voltage groups comprise a fifth predetermined DC bias voltage group, wherein the predetermined I path DC bias voltage and the predetermined Q path DC bias voltage of the fifth DC bias voltage group are 0.

6. The transceiving circuit of claim 1, wherein the frequency domain analyzing circuit outputs the frequency domain signals while the frequency domain analyzing circuit operates at five different predetermined DC bias voltage groups, wherein the DC bias voltage determines parameters of the equation according to the frequency domain signals and the predetermined DC bias voltage groups.

7. The transceiving circuit of claim 1, wherein the frequency domain analyzing circuit outputs a first frequency domain signal while the mixer operates at the first DC bias voltage group after the DC bias voltage generating circuit generates the first DC bias voltage group to the mixer, and the DC bias generating circuit further generates a second DC bias voltage group to the mixer according to the first frequency domain signal and the equation.

8. The transceiving circuit of claim 1, wherein the frequency domain analyzing circuit comprises a single frequency Fourier Transform circuit.

9. A receiving circuit control method, applied to a transceiving circuit comprising a transmitting circuit, a receiving circuit and a frequency domain analyzing circuit, wherein the receiving circuit comprises a mixer, and the receiving circuit control method comprises:
transmitting a test signal by the transmitting circuit;
configuring the mixer to receive a plurality of predetermined DC bias voltage groups, wherein the receiving circuit generates a plurality of output signals according to the test signal while the mixer operates at the predetermined DC bias voltage groups;

transforming the plurality of output signals to a plurality of frequency domain signals by the frequency domain analyzing circuit; and determining parameters of an equation according to the frequency domain signals and the predetermined bias voltage groups, and generating a first DC bias voltage group to the mixer according to the equation.

10. The receiving circuit control method of claim 9, wherein the mixer comprises a first mixer corresponding to an I path and a second mixer corresponding to a Q path, and each one of the predetermined DC bias voltage groups comprises a predetermined I path DC bias voltage and a predetermined Q path DC bias voltage;

wherein the equation is $P(Vi,Vq)=miVi+mqVq+P(Vi=0, Vq=0)$, in which Vi indicates a DC bias voltage received by the first mixer, Vq indicates a DC bias voltage received by the second mixer, $P(Vi, Vq)$ is a signal strength of the frequency domain signal output by the frequency domain analyzing circuit at a test frequency, mi and mq are coefficients;

wherein $P(Vi=0, Vq=0)$ is a signal strength of the frequency domain signal output by the frequency domain analyzing circuit at the test frequency while Vi and Vq are zero;

wherein the receiving circuit control method further comprises:

computing the mi and mq according to the frequency domain signals and the predetermined DC bias voltage groups, and computing a first I path DC bias voltage and a first Q path DC bias voltage as the first DC bias voltage group according to the equation, wherein the test signal decides the test frequency.

11. The receiving circuit control method of claim 10, wherein the predetermined DC bias voltage groups comprise a first and a second predetermined DC bias voltage groups, wherein the predetermined I path DC bias voltage and the predetermined Q path DC bias voltage of the first DC bias voltage group are (−Vo,0), and the predetermined I path DC bias voltage and the predetermined Q path DC bias voltage of the second DC bias voltage group are (Vo,0), in which Vo is a predetermined voltage.

12. The receiving circuit control method of claim 10, wherein the predetermined DC bias voltage groups comprise a third and a fourth predetermined DC bias voltage groups, wherein the predetermined I path DC bias voltage and the predetermined Q path DC bias voltage of the third DC bias voltage group are (0,−Vo), and the predetermined I path DC bias voltage and the predetermined Q path DC bias voltage of the fourth DC bias voltage group are (0,Vo), wherein Vo is a predetermined voltage.

13. The receiving circuit control method of claim 10, wherein the predetermined DC bias voltage groups comprise a fifth predetermined DC bias voltage group, wherein the predetermined I path DC bias voltage and the predetermined Q path DC bias voltage of the fifth DC bias voltage group are 0.

14. The receiving circuit control method of claim 9, further comprising:

outputting the frequency domain signals by the frequency domain analyzing circuit while the frequency domain analyzing circuit respectively operates at five different predetermined DC bias voltage groups, wherein the parameters of the equation is determined according to the frequency domain signals and the predetermined DC bias voltage groups.

15. The receiving circuit control method of claim 9, further comprising:

outputting a first frequency domain signal via the frequency domain analyzing circuit while the mixer operates at the first DC bias voltage group after the DC bias voltage generating circuit generates the first DC bias voltage group to the mixer; and further generating a second DC bias voltage group to the mixer according to the first frequency domain signal and the equation.

16. The receiving circuit control method of claim 9, wherein the frequency domain analyzing circuit comprises a single frequency Fourier Transform circuit.

17. A voltage generating circuit, comprising:

an operational circuit, configured to provide a constant parameter;

a long division circuit, configured to perform long division to a signal inputted to the long division circuit;

a first subtractor, comprising a first input terminal and a first subtracting terminal;

a second subtractor, comprising a second input terminal and a second subtracting terminal;

a third subtractor, comprising a third input terminal and a third subtracting terminal;

a fourth subtractor, comprising a fourth input terminal and a fourth subtracting terminal;

a first multiplier, comprising a first input terminal coupled to an output terminal of the first subtractor, and comprising a second input terminal;

a second multiplier, comprising a third input terminal coupled to an output terminal of the second subtractor, and comprising a fourth input terminal;

a third multiplier, comprising a fifth input terminal coupled to the output terminal of the first subtractor, and comprising a sixth input terminal coupled to the output terminal of the fourth subtractor;

a fourth multiplier, comprising a seventh input terminal coupled to the output terminal of the second subtractor, and comprising an eighth input terminal coupled to an output terminal of the third subtractor;

a fifth multiplier, comprising a ninth input terminal coupled to the output terminal of the fourth subtractor, and comprising a tenth input terminal;

a sixth multiplier, comprising an eleventh input terminal coupled to the output terminal of the third subtractor, and comprising a twelfth input terminal;

a first adder, comprising a first input terminal coupled to an output terminal of the first multiplier, a second input terminal coupled to an output terminal of the second multiplier, and an output terminal coupled to the operational circuit;

a fifth subtractor, comprising a fifth input terminal coupled to an output terminal of the sixth multiplier, a fifth subtracting terminal coupled to an output terminal of the fifth multiplier, and an output terminal coupled to the operational circuit;

a sixth subtractor, comprising a sixth input terminal coupled to an output terminal of the third multiplier, a sixth subtracting terminal coupled to an output terminal of the fourth multiplier, and an output terminal coupled to the long division circuit.

* * * * *